J. P. BURASCHI.
LEATHER CREASING MACHINE.
APPLICATION FILED DEC. 1, 1916.

1,218,369.

Patented Mar. 6, 1917.

John P. Buraschi.
INVENTOR.
By George J. Ottseh
Attorney.

UNITED STATES PATENT OFFICE.

JOHN P. BURASCHI, OF SOUTH BEND, INDIANA.

LEATHER-CREASING MACHINE.

1,218,369.  Specification of Letters Patent.  Patented Mar. 6, 1917.

Application filed December 1, 1916. Serial No. 134,471.

*To all whom it may concern:*

Be it known that I, JOHN P. BURASCHI, a citizen of Peru, residing at South Bend, in the county of St. Joseph and State of Indiana, have invented certain new and useful Improvements in Leather-Creasing Machines, of which the following is a specification.

The invention relates to a machine designed particularly for creasing leather or similar substances, with a view to providing a product of the well-known tufted character, used more particularly in upholstery.

In the upholstering art, particularly for the backs of automobile seats and the like, the leather covering is formed with a series of longitudinal tufts, and such tufts have been heretofore formed in the material by separately marking off and creasing the same. Such hand operation has resulted in tufts of non-uniform character, in that they were of irregular spacing and not parallel.

The object of the present invention, therefore, is to provide a machine, adapted for the simultaneous treatment of a hide of leather, and serving, when operated, to crease the leather in absolute uniformity as to spacing and parallelism.

The invention to be described in the following specification, with particular reference to the accompanying drawings, embodies the preferred details of structure.

In the drawings;—

Figure 1:
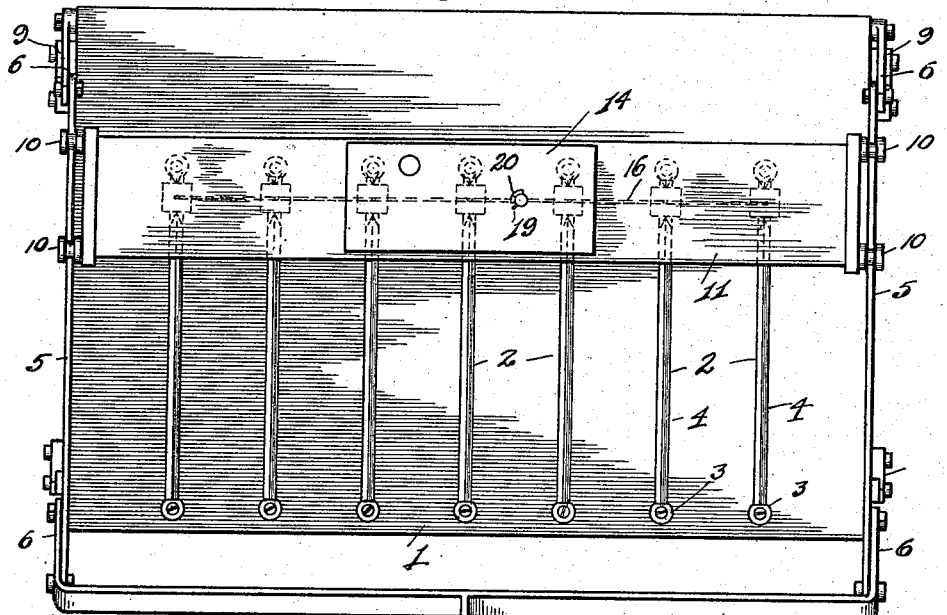
Figure 1 is a plan of the improved machine.
Figure 2:
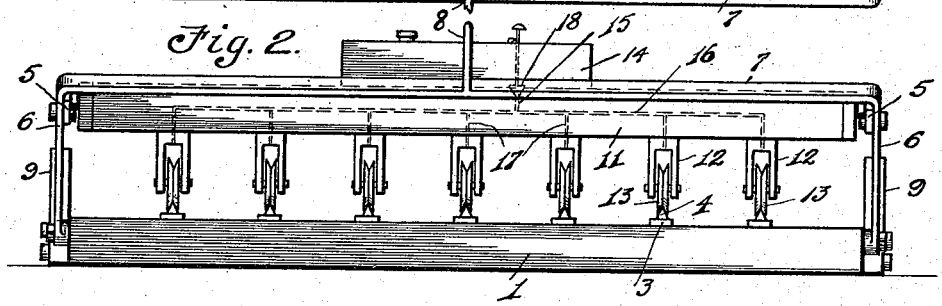
Fig. 2 is a front elevation thereof.
Figure 3:
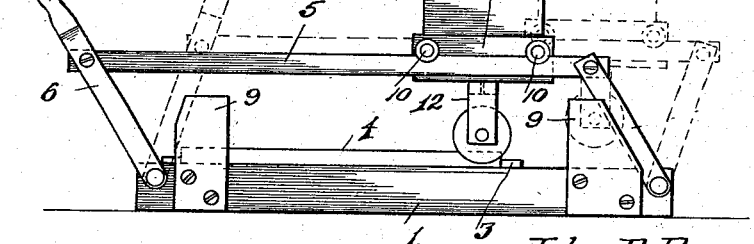
Fig. 3 is a side elevation thereof.

In the preferred details, the machine comprises a base 1, preferably of wood, and of a size to support a hide or other desired section of material to be operated on. Secured upon the upper or material receiving surface of the base are a series of creasing bars 2. The bars 2 are arranged in parallelism, and in uniform spaced relation longitudinally of the base, and each comprises a relatively broad bearing portion 3 to rest on the base and a comparatively narrow creasing portion 4, terminating in a comparatively sharp creasing edge.

Movable trackways 5 are connected with the base through the medium of links 6 arranged respectively at the forward and rear ends of the trackways and pivotally connected thereto and to the base. The forward links 6 are integrally projected beyond the trackways in the form of a yoke 7, which yoke extends across the front of the machine, and is provided at a suitable point with a handle 8, whereby the tracks may be moved to and from the base through the pivoted link connection. The yoke insures that the trackways move in unison, and the base is provided adjacent the forward and rear edges with stops 9, to be engaged by the links at the respective limits of movement thereof, to position the tracks with relation to the base.

Slidably mounted on the trackways, preferably through grooved rollers 10, is a carriage 11, in the form of a block, on the lower surface of which is secured bearing yokes 12, rotatably supporting at their lower ends creasing rolls 13, having a peripheral edge formation corresponding to the formation of the creasing bars. The creasing rolls are spaced in correspondence with the spacing of the creasing bars, so that when the carriage is lowered with respect to the base, by appropriate movement of the trackways, the creasing rolls engage and coöperate with the respective creasing bars.

Secured upon the carriage is a tank 14, preferably for water, or other fluid, capable of softening the material to be creased. The tank has an outlet 15 communicating with a passage 16, extending longitudinally of the carriage, and such passage communicates with lateral ports 17, to deliver the water or other fluid to each creasing wheel. The tank outlet is preferably controlled by a valve 18, adapted to be normally closed and to be held open by any holding-means. I have illustrated a conventional type, comprising a pin 19 projecting from the valve-stem above the tank, and an inclined lug or cam 20 secured upon the top of the tank to be engaged by the pin in the turning of the valve, to lift the valve from its seat. Any type of holding-means may, however, be used in this connection.

The hide or other material is laid upon the base, with the portion to be creased overlying the creasing bars. The carriage is then depressed by lowering the trackways through the operation described, and the creasing rolls moved longitudinally of the surface to be creased. The coöperative action of the bars and rolls under sufficient pressure, during movement of the rolls, will cause an effective creasing of the leather, or other material. The resultant creases in the material will be absolutely uniform as to sectional formation, and absolutely uniform as to spacing and parallelism. The creases so formed may be subsequently treated or laid, as may be desirable in the particular use for which they are intended.

What I claim is:—

1. A creasing machine, comprising a base having creasing-bars thereon, and a carriage movable longitudinally of the base, and carrying creasing-rolls to coöperate with the creasing-bars.

2. A creasing machine, comprising a base having creasing-bars thereon, a carriage having creasing-rolls to coöperate with said bars, and means movably supporting the carriage and adjustable with relation to the base, to move the carriage to and from the base.

3. A creasing machine, comprising a base having creasing-bars thereon, a carriage having creasing-rolls to coöperate with the bars, trackways for supporting the carriage, and means for moving the trackways to and from the base.

4. A creasing machine, comprising a base having creasing-bars thereon, a carriage having creasing-rolls to coöperate with said bars, trackways movably supporting the carriage, and links pivotally connecting the trackways and base, to permit movement of the trackways and supported carriage, to and from the base.

5. A creasing machine, having coöperating creasing-bars and creasing-rolls, and means for delivering a softening fluid to the creasing-rolls.

6. A creasing machine, having a base, with creasing-bars thereon, a carriage movable on the base, and having creasing-rolls to coöperate with the creasing-bars, and a fluid-tank supported on the carriage, said tank and carriage having communicating passages to deliver the fluid of the tank to the creasing-rolls.

In testimony whereof I affix my signature in presence of two witnesses.

JOHN P. BURASCHI.

Witnesses:
 JOHN S. BUCZKOWSKI,
 GEORGE J. OLTSCH.

Copies of this patent may be obtained for five cents each, by addressing the "Commissioner of Patents, Washington, D. C."